United States Patent
Tamekuni et al.

[11] Patent Number: 5,993,070
[45] Date of Patent: Nov. 30, 1999

[54] OPTICAL CONNECTOR AND A METHOD OF ATTACHING THE SAME

[75] Inventors: Yoshikyo Tamekuni; Tomohiko Ueda, both of Kanagawa; Kazuo Hogari, Tokyo; Shin-ichi Furukawa, Ibaragi, all of Japan

[73] Assignees: Sumitomo Electric Industries, Ltd., Osaka; Nippon Telegraph and Telephone Corporation, Tokyo, both of Japan

[21] Appl. No.: 08/948,076

[22] Filed: Oct. 9, 1997

[30] Foreign Application Priority Data

Oct. 9, 1996 [JP] Japan .................................. 8-268429
May 29, 1997 [JP] Japan .................................. 9-139849

[51] Int. Cl.$^6$ ............................................ G02B 6/36
[52] U.S. Cl. .............................. 385/65; 385/137; 385/83
[58] Field of Search ............................... 385/65, 83, 147, 385/137, 136

[56] References Cited

U.S. PATENT DOCUMENTS 5,185,837 2/1993 Ayuta et al. ............................... 385/81
5,761,360 6/1998 Grois et al. ............................... 385/81

FOREIGN PATENT DOCUMENTS

| 63-8613 | 1/1988 | Japan . |
| 63-186205 | 8/1988 | Japan . |
| 64-72105 | 3/1989 | Japan . |
| 6-337325 | 12/1994 | Japan . |
| 7-69498 | 7/1995 | Japan . |
| 9-127371 | 5/1997 | Japan . |

*Primary Examiner*—Hung N. Ngo
*Attorney, Agent, or Firm*—Pillsbury Madison & Sutro LLP

[57] ABSTRACT

A short optical fiber 2 is incorporated in a ferrule 1 having a polished front end, so as to be projected from the rear end of the ferrule. In a base member 3 in which the short optical fiber is to be fitted into a hole 3b, a V-groove 3d to which the glass portion of an optical fiber is to be fixed, and a V-groove 3e to which the coated portion is to be fixed are formed. A cover member 4 is placed on the base member. The base member 3 and the cover member 4 are clamped by clamp members 5a and 5b and the base member 3 presses the V-grooves. Wedges which are not shown are pressingly inserted between recesses 3g and 4c, and 3h and 4d, and an optical fiber 10 is inserted from the rear portion. Thereafter, the wedges are detached and the optical connector is attached to the terminal of the optical fiber 10.

15 Claims, 8 Drawing Sheets

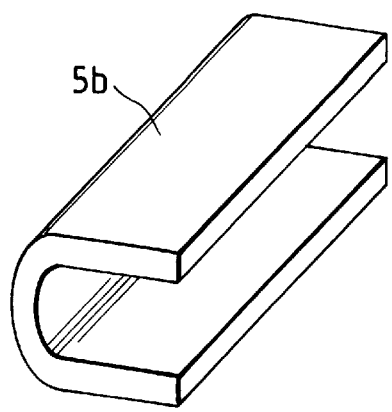
FIG. 7
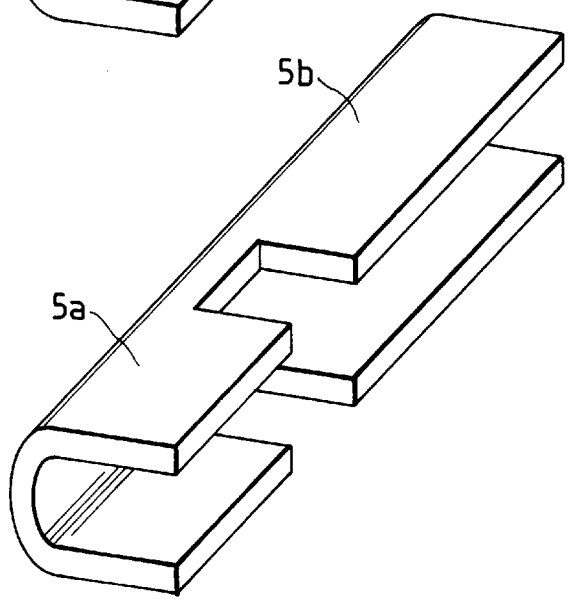
FIG. 8
FIG. 9A
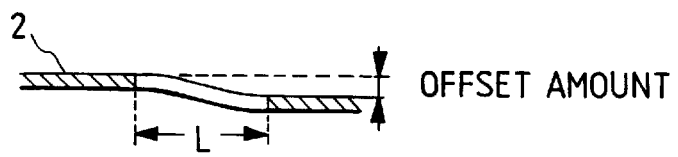
FIG. 9B
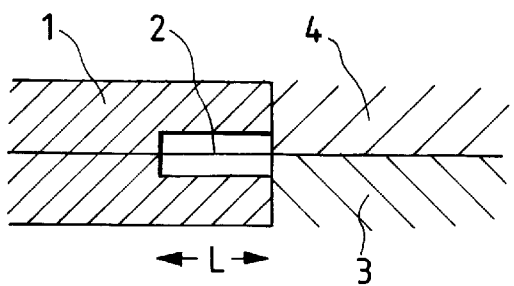
FIG. 9C
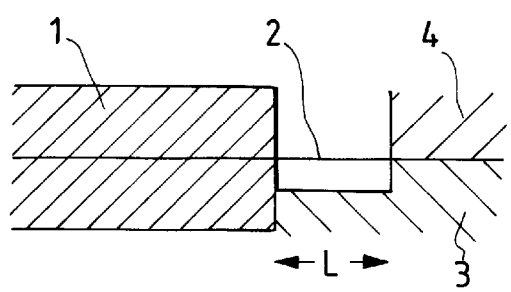

OPTICAL CONNECTOR AND A METHOD OF ATTACHING THE SAME

BACKGROUND OF THE INVENTION

1. Field of the Invention

The invention relates to an optical connector for connecting optical fibers to each other, and also to a method of attaching the optical connector.

2. Description of the Related Art

Conventionally, a connecting method is employed in which a short optical fiber is previously attached to a ferrule of an optical connector and an optical fiber to which the optical connector is to be connected is then connected to the short optical fiber. In the method, since the short optical fiber is previously attached to the ferrule, the front end of the ferrule can be previously polished under a state where an optical fiber is attached. Therefore, it is not required to conduct a polishing work during a work of attaching the optical connector to an optical fiber, thereby producing an advantage that the work of attaching the optical connector can be completed in a short time.

In each of optical connectors disclosed in Japanese patent publication (Kokai) No. SHO 63-186205, Japanese patent publication (Kokoku) No. HEI 7-69498, and Japanese patent publication (Kokai) No. SHO 64-72105, a short optical fiber of a ferrule is connected to an optical fiber to which the connector is to be attached, by means of fusion or adhesion. The connection due to fusion has a problem in that a fusing apparatus is required, and that due to adhesion has a problem in that a prolonged time period is necessary for conducting the adhesion work. In the case where an ultraviolet-setting resin is used in adhesion, there is another problem in that an ultraviolet irradiator is necessary. When a fusing apparatus or an ultraviolet irradiator is used, there arises a further problem in that a place for installing such an apparatus and a power source must be ensured. Consequently, such methods are not always suitable for a work in the field.

Japanese patent publication (Kokai) No. SHO 63-8613 discloses an optical connector having a cylindrical ferrule consisting of two capillaries. The optical connector is assembled while a short optical fiber is previously fixed to one of the capillaries, and the fixed optical fiber is inserted to the other small bore. The optical fibers are contacted with each other in the small bore. Also an optical connector disclosed in Japanese patent publication (Kokai) No. HEI 6-337325 employs a method in which an optical fiber to which the optical connector is to be connected is contacted with a short optical fiber in a small bore of a capillary. In the case where a capillary is used as described above, since two optical fibers are not fixed in the coupling portion, there is a problem in that variation of the ambient temperature or an operation of handling the optical connector may easily cause misalignment and a gap between the cores of the optical fibers, which are main factors of variation of the optical loss.

By contrast, an optical connector proposed in Japanese patent application No. HEI 7-283420 has a configuration in which a semispherical space is formed at a center portion of a ferrule, a short optical fiber and an optical fiber to which the optical connector is to be attached are butted together on the ferrule and in the space, and a holding member is fixed to the space, thereby pressing the optical fibers. In the optical connector, fusion and adhesion are not conducted, and hence a fusing apparatus is not necessary and a time period of conducting an adhesion work is not required. Therefore, the proposed optical connector has an advantage that the work of connecting optical fibers together can be completed in a short time. Since the coupling portion of the two optical fibers is pressed by the holding member, moreover, there is an advantage that the coupling state can be ensured. However, the optical connector has the following problem. Since a ferrule of a special structure is used, a groove in which optical fibers are butted together is a half-round groove having a shape which is formed by splitting an optical fiber hole into halves. Consequently, the axial misalignment is larger in degree as compared with the case where a V-groove is used.

SUMMARY OF THE INVENTION

The invention has been conducted in view of the above-mentioned circumstances. It is an object of the invention to provide an optical connector which can be easily attached to an optical fiber and in which the attaching work can be completed in a short time and the optical fiber can be surely coupled with a short optical fiber.

According to the invention, an optical connector comprises: a ferrule which incorporates a short optical fiber in a small bore which is formed along a center axis, the short optical fiber being projected from a rear end of the ferrule, the ferrule having a polished front end face; a base member having a holding portion which holds the rear end of the ferrule, and an optical fiber positioning and fixing groove which is formed in an upper face to be continuous with the small bore; a cover member which presses an optical fiber against the optical fiber positioning and fixing groove; and a clamp member which presses the cover member toward the base member, the connector further comprising a wedge insertion portion into which a wedge for pressingly separating the cover member and the base member from each other can be inserted.

According to the invention, in the optical connector of the first aspect, the cover member presses an optical fiber to be attached to the optical connector, toward the base member and against the optical fiber positioning and fixing groove at two portions, i.e., a portion where the short optical fiber is connected with the optical fiber to be attached, and a coated portion of the optical fiber to be attached.

According to the invention, the wedge insertion portion is disposed so as to pressingly separate the cover member and the base member from each other at the two portions i.e., the portion where the short optical fiber is connected with the optical fiber to be attached, and the coated portion of the optical fiber to be attached.

According to the invention, the optical fiber positioning and fixing groove formed in the base member has a V-like section shape.

According to the invention, the optical fiber positioning and fixing groove formed in the base member has a trapezoidal section shape.

According to the invention, the short optical fiber has a mirror-finished rear end.

According to the invention, the front end face of the ferrule is polished into a spherical shape.

According to the invention, the front end face of the ferrule is obliquely mirror-polished.

According to the invention, the front end face of the ferrule is mirror-polished in a direction perpendicular to an optical fiber axis.

According to the invention, the base member is made of a substance having a coefficient of linear expansion which is substantially equal to a coefficient of linear expansion of the optical fiber.

According to the invention, an outer periphery of the short optical fiber is coated by a metal or carbon.

According to the invention, a space in which the optical fiber is free is formed between a rear end of the small bore of the ferrule and a front end of a fiber presser which presses the short optical fiber and which is disposed on the base member.

According to the invention, a housing which can be fitted with an SC type optical connector is attached to the optical connector.

According to the invention, the wedge can be inserted or detached under a state where a housing is assembled.

According to the invention, an outer periphery of a rear end face of the short optical fiber is chamfered.

According to the invention, a size of the chamfer of the short optical fiber is not smaller than 10 μm.

According to the invention, a work of chamfering the short optical fiber is conducted by an electric discharge.

According to the invention, a method of attaching an optical connector uses the above-mentioned optical connector, and comprises the steps of: inserting the wedge into the wedge insertion portion, thereby forming a space into which the optical fiber can be inserted, between the base member and the cover member; inserting the optical fiber from a rear side of the optical connector until the optical fiber abuts against the short optical fiber; and detaching the wedge, thereby attaching the optical connector to a terminal of the optical fiber.

According to the invention, the optical connector is assembled while a cylindrical member having an outer diameter which is substantially equal to an outer diameter of the short optical fiber is disposed so as to be continuous with a rear end of the short optical fiber, above the optical fiber positioning and fixing groove.

According to the invention, the cylindrical member is a silica optical fiber.

According to the invention, a method of attaching an optical connector uses the above-mentioned optical connector, and comprises the steps of: inserting the wedge into the wedge insertion portion, thereby removing the cylindrical member; inserting the optical fiber from a rear side of the optical connector until the optical fiber abuts against the short optical fiber, into a space which is formed between the base member and the cover member by the insertion of the wedge and into which the optical fiber can be inserted; and detaching the wedge, thereby attaching the optical connector to a terminal of the optical fiber.

According to the invention, the optical connector is assembled while a dummy member is pressingly held between the cover member and the base member, thereby preventing the cover member and the base member from substantially applying a pressing force on the short optical fiber.

According to the invention, a method of attaching an optical connector uses the above-mentioned optical connector, and comprises the steps of: removing the dummy member; inserting the wedge into the wedge insertion portion, thereby forming a space into which the optical fiber can be inserted, between the base member and the cover member; inserting the optical fiber from a rear side of the optical connector until the optical fiber abuts against the short optical fiber; and detaching the wedge, thereby attaching the optical connector to a terminal of the optical fiber.

According to the invention, in a method of attaching an optical connector, the space which is formed by holding the dummy member in the above-mentioned optical connector and which is between the base member and the cover member is configured so that the optical fiber can be inserted into the space, and the method comprises the steps of: inserting the optical fiber from a rear side of the optical connector until the optical fiber abuts against the short optical fiber; and detaching the dummy member, thereby attaching the optical connector to a terminal of the optical fiber.

According to the invention, an optical connector comprises a ferrule which incorporates a short optical fiber and which has a polished front end face, an outer periphery of a rear end face of the short optical fiber being chamfered.

According to the invention, an optical connector comprises: a ferrule which incorporates a short optical fiber in a small bore which is formed along a center axis, the short optical fiber being projected from a rear end of the ferrule, the ferrule having a polished front end face; a base member having a holding portion which holds the rear end of the ferrule, and an optical fiber positioning and fixing groove which is formed in an upper face to be continuous with the small bore; a cover member which presses an optical fiber against the optical fiber positioning and fixing groove; and a clamp member which presses the cover member toward the base member, an outer periphery of a rear end face of the short optical fiber being chamfered.

According to the invention, a size of the chamfer of the short optical fiber is not smaller than 10 μm.

According to the invention, a work of chamfering the short optical fiber is conducted by an electric discharge.

The above and other objects and features of the present invention will be more apparent from the following description taken in conjunction the accompanying drawings.

BRIEF DESCRIPTION OF THE DRAWINGS

FIG. 1A is a side view, FIG. 1B is a plan view, and FIG. 1C is a section view taken along a plane perpendicular to the sheet of FIG. 1B;

FIG. 7 show a modification of a clamp member;

FIG. 8 show another modification of the clamp member;

FIGS. 9A to 9C are diagrams illustrating a free space;

DETAILED DESCRIPTION OF THE PREFERRED EMBODIMENTS

Now, a description will be given in more detail of preferred embodiments of the invention with reference to the accompanying drawings.

Figure 1A:
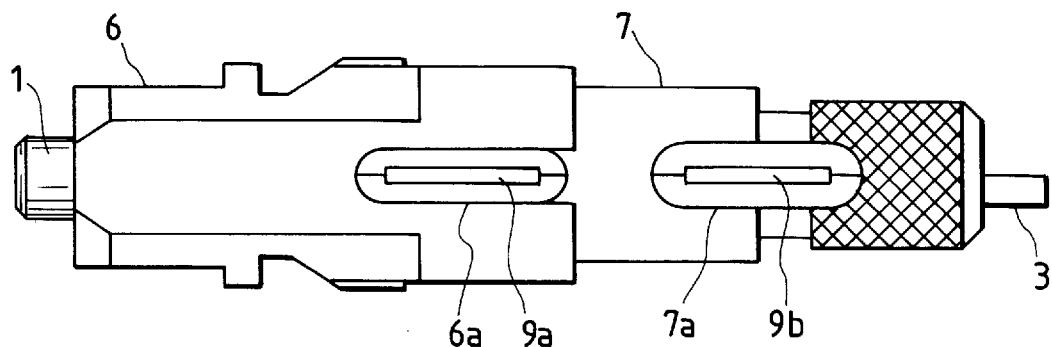
FIGS. 1A to 1C illustrate a first embodiment of the optical connector of the invention, where
Figure 1B:
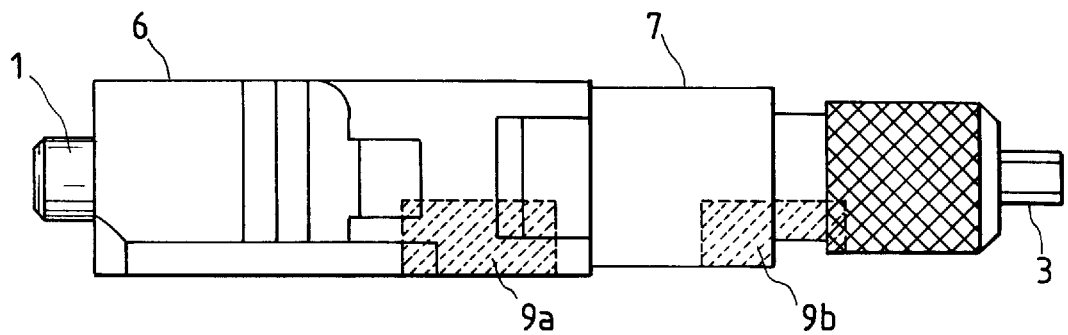
Figure 1C:
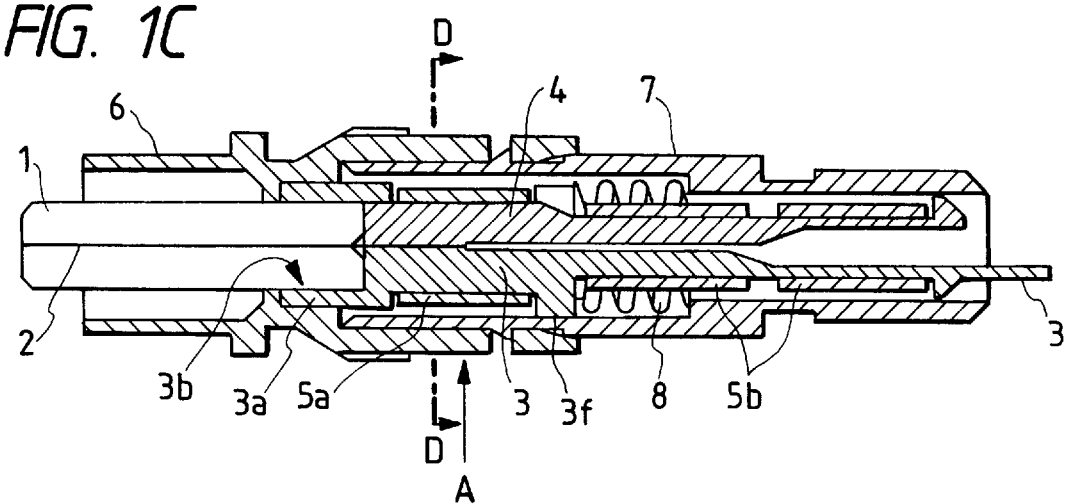
Figure 2:
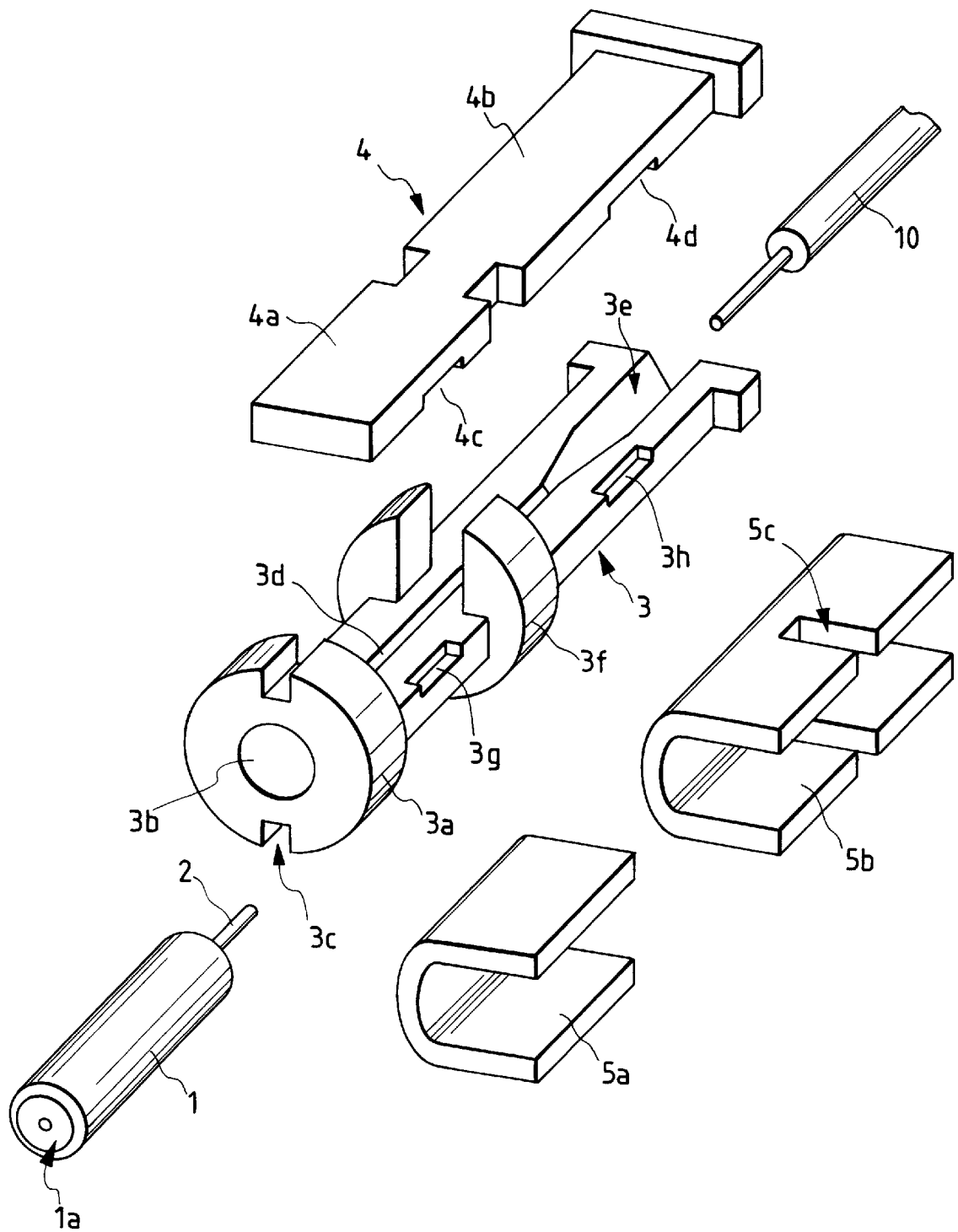
FIG. 2 is a perspective view diagrammatically showing the structure of main portions of FIG. 1.

FIGS. 1A to 1C and 2 illustrate a first embodiment of the optical connector of the invention. FIG. 1A is a side view, FIG. 1B is a plan view, FIG. 1C is a section view taken along a plane perpendicular to the sheet of FIG. 1B, and FIG. 2 is a perspective view diagrammatically showing the structure of main portions. In the figures, 1 designates a ferrule, 1*a* designates a front end face, 2 designates a short optical fiber, 3 designates a base member, 3*a* designates a flange, 3*b* designates a hole, 3*c* designates a notched groove, 3*d* and 3*e* designate optical fiber positioning and fixing grooves, 3*f* designates a flange, 3*g* and 3*h* designate recesses, 4 designates a cover member, 4*a* and 4*b* designate pressing portions, 4*c* and 4*d* designate recesses, 5*a* and 5*b* designate clamp members, 5*c* designates a notch, 6 designates a stop ring, 6*a* designates an aperture, 7 designates a plug frame, 7*a* designates an aperture, 8 designates a coil spring, 9*a* and 9*b* designate wedge insertion holes, and 10 designates an optical fiber. In the ferrule 1, a small bore into which an optical fiber can be inserted is opened along the center axis. The short optical fiber 2 is inserted into the small bore and bonded thereto. The front end face 1*a* is polished so as to be perpendicular to the axis. The short optical fiber 2 is projected from the rear end of the ferrule 1. The rear end of the short optical fiber may not be processed after cutting. Alternatively, the rear end may be polished so as to constitute a mirror finished surface in order to reduce the connection loss.

The finished state of the front end face of the ferrule is not restricted to a mirror-polished surface which is perpendicular to the axis as shown in FIGS. 1A to 1C. In the case where the front end face is obliquely mirror-polished, there is an advantage that the reflected light from the end face is diverged to the outside of the system. Alternatively, a PC (Physical Contact) coupling may be realized by a spheric working process.

The base member 3 and the cover member 4 is made by, for example, a liquid crystal polymer or an epoxy containing a filler of 70% or more therein. The material of the member is not restricted to a liquid crystal polymer. From the view point of temperature characteristics, a substance having a coefficient of linear expansion which is substantially equal to that of the glass of the optical fiber is preferably used. The flange 3*a* is disposed at the front end of the base member 3 and the circular hole 3*b* is formed in the flange. The rear end portion of the ferrule 1 is fitted into the circular hole 3*b*, thereby causing the ferrule 1 to be held by the base member 3. Alternatively, the ferrule and the base member are fixed together by an adhesive agent. In the flange 3*a*, the notched groove 3*c* is formed at an appropriate position so as to prevent the optical connector from rotating when the optical connector is connected to another optical connector or the like. The optical fiber positioning and fixing grooves 3*d* and 3*e* are formed in the upper face of the base member 3. The optical fiber positioning and fixing groove 3*d* is a portion to which the glass portion of the short optical fiber 2 and that of an optical fiber to which the optical connector is to be attached are fixed. The groove is formed as a V-groove. Under the state where the ferrule 1 is held by the base member 3, the rear end of the short optical fiber 2 is at a position in the optical fiber positioning and fixing groove 3*d*. The arrow A of FIG. 1C shows the position. The optical fiber positioning and fixing groove 3*e* is a portion to which the coated portion of the optical fiber to which the optical connector is to be attached is fixed. The groove is formed as a trapezoidal groove. As seen from FIG. 1C, the flange 3*f* which is formed in an intermediate portion of the base member 3 is a portion against which the coil spring 8 abuts. The rear end of the base member 3 may have an appropriate shape.

The cover member 4 is used for pressing the optical fiber inserted into the optical fiber positioning and fixing grooves, and consists of the pressing portion 4*a* which presses the portion in the optical fiber positioning and fixing groove 3*d*, and the pressing portion 4*b* which presses the portion in the optical fiber positioning and fixing groove 3*e*. In the embodiment, the pressing portions 4*a* and 4*b* are integrally formed. Alternatively, the cover member may be divided into two parts so that the pressing portions 4*a* and 4*b* are configured as separate members.

The clamp members 5*a* and 5*b* are used for exerting a spring force by which the cover member 4 is pressed toward the base member 3. In the embodiment, plate springs having a U-like section shape are used as the clamp members. As seen from FIGS. 1C and 2, the clamp member 5*a* applies a spring force by which the pressing portion 4*a* of the cover member 4 is pressed toward the base member 3, and the clamp member 5*b* exerts a spring force by which the pressing portion 4*b* of the cover member 4 is pressed toward the base member 3. In the embodiment, the spring force of the clamp member 5*b* is divided into two parts by the notch 5*c*. The rear part exerts a pressing force on the portion in the optical fiber positioning and fixing groove 3*e*. The front part exerts a pressing force on the portion in the optical fiber positioning and fixing groove 3*d* and in the rear of the position indicated by the arrow A.

The manner of assembling the optical connector will be described. The ferrule 1 is fitted into the hole 3*b* of the base member 3. With respect to the center axis of the ferrule 1 and the optical fiber positioning and fixing groove 3*d*, the upper face of the base member is defined so that the glass portion of the optical fiber elongates along a line. Therefore, the short optical fiber projected from the rear end of the ferrule 1 is inserted into the optical fiber positioning and fixing groove 3*d*. The cover member 4 is placed on the base member, and the clamp members 5*a* and 5*b* are set, so that the cover member 4 is clamped onto the base member 3. When the cover member 4 is placed on the base member 3, the recesses 3*g* and 3*h* shown in FIG. 2 which are formed by partially removing away the base member 3 are joined with the recesses 4*c* and 4*d* to form the wedge insertion holes 9*a* and 9*b* shown in FIG. 1A, respectively. In FIG. 1B, the hatched portions of broken lines show the positions of the wedge insertion holes 9*a* and 9*b*. The coil spring 8 is then fitted onto the members and the plug frame 6 and the stop ring 7 are coupled together, thereby completing the optical connector as shown in FIGS. 1A to 1C. When the plug frame 6 is configured so as to coincide with the SC type connector (a single-core optical fiber connector of the F04 type of JIS C 5973), the general versatility is enhanced.

In the plug frame 6 and the stop ring 7, the apertures 6*a* and 7*a* are opened in order to expose the wedge insertion holes 9*a* and 9*b* under the state where the optical connector is assembled. In the work of coupling the plug frame 6 and the stop ring 7 together, therefore, the coupling is conducted in a positional relationship in which the apertures 6*a* and 7*a* respectively coincide with the wedge insertion holes 9*a* and 9*b*.

The optical connector which has been completed as described above is attached to the front end of the optical fiber. Before the attachment, wedges which are not shown are respectively inserted into the wedge insertion holes 9a and 9b so that the base member 3 and the cover member 4 are separated from each other against the forces exerted by the clamp members 5a and 5b. when the base member 3 and the cover member 4 are separated from each other, the optical fiber 10 can be inserted from the side of the optical fiber positioning and fixing groove 3e as shown in FIG. 2. When the front end of the inserted optical fiber 10 advances to abut the rear end of the short optical fiber, the wedges are detached. As a result, the inserted optical fiber 10 can be fixed. Preferably, an index matching material is applied to a part of the optical fiber positioning and fixing groove 3d so that the rear end of the short optical fiber 2 abuts against the front end of the optical fiber 10 via the index matching material.

Figure 3A:
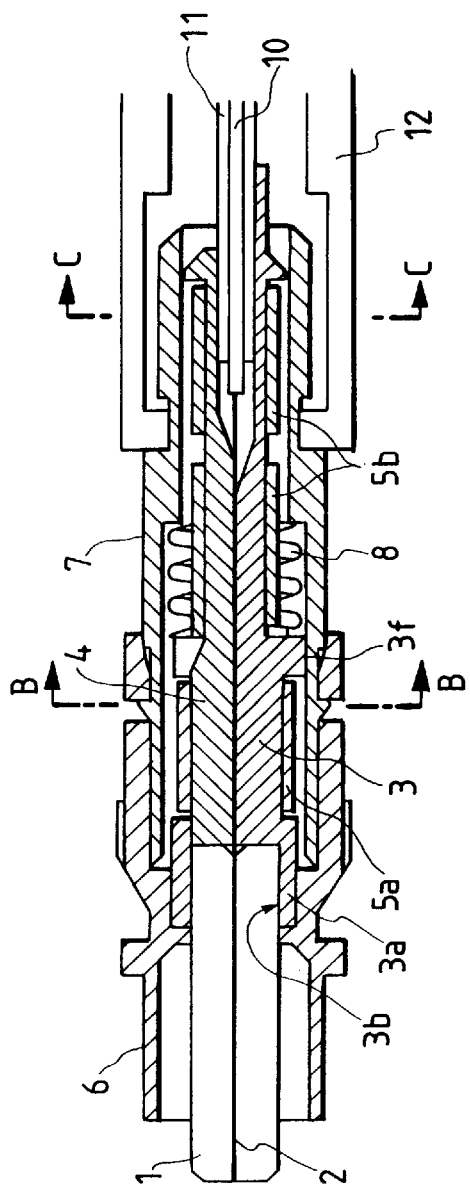
FIGS. 3A and 3B are section views illustrating a state where the optical connector is attached to an optical fiber.
Figure 3B:
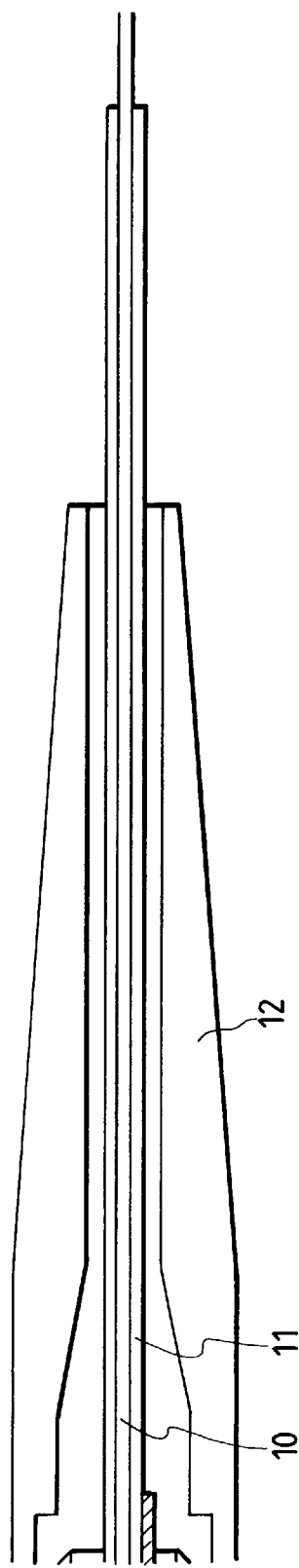

FIGS. 3A to 3C illustrate the state where the optical connector is attached to the optical fiber. The figure is split into two portions, i.e., FIGS. 3A and 3B in such a manner that the portions partly overlap with each other. The reference numeral 11 designates a protection tube, 12 designates a boot. In the embodiment, the optical fiber 10 is configured by providing a glass fiber with a cover of an ultraviolet-setting resin having an overall outside diameter of about 0.25 mm. In the invention, the configuration of an optical fiber is not restricted to this, and any appropriate additional protective cover made of a resin such as nylon or the like may be applied thereto. When an optical fiber which is not provided with a protective cover of nylon or the like is used, there arises a problem in that the optical fiber is easily broken at a rear end portion of an optical connector to which the optical fiber is attached. Therefore, the protection tube 11 and the boot 12 are used. After the optical fiber 10 is passed through them, the optical fiber 10 which is passed through the protection tube is inserted and fixed by using the wedges as described above. Thereafter, the front end portion of the boot 12 is pressingly inserted into the rear end of the stop ring 7 so as to be engaged therewith.

Figure 4A:
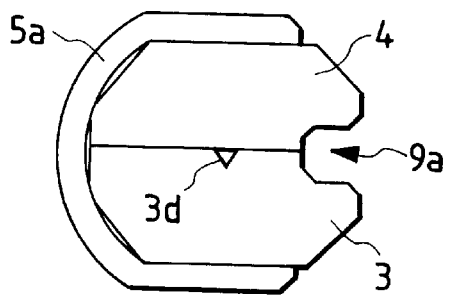
FIGS. 4A and 4B are section views showing center portions of the sections taken along the lines B—B and C—C of FIG. 3A.
Figure 4B:
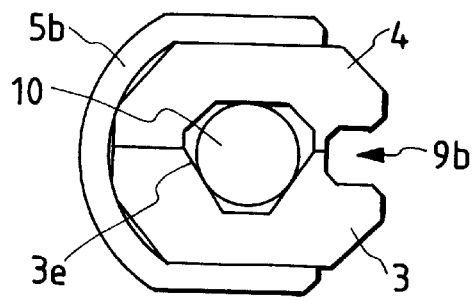

FIGS. 4A and 4B show center portions of the sections taken along the lines B—B and C—C of FIG. 3A, respectively. In the figures, the components identical with those of FIGS. 1A to 1C and 2 are designated by the same reference numerals and their description is omitted. Referring to FIG. 4A, the optical fiber positioning and fixing groove 3d (FIG. 2) of the base member 3 is formed as a V-groove. The glass portion of an optical fiber which is not shown in the figures is housed in the groove, and then pressed by the cover member 4. The pressing force is applied by the clamp member 5a.

FIG. 4B shows a part on the side of the optical fiber positioning and fixing groove 3e (FIG. 2). The optical fiber positioning and fixing groove 3e which is formed in the base member 3 has a trapezoidal section shape. A groove is formed also in the cover member 4, and the coated portion of the optical fiber 10 is pressingly fixed by the clamp member 5b. In this example, a groove is formed also in the cover member 4. This groove is not always necessary.

The optical fiber positioning and fixing groove for fixing the glass portion of the optical fiber, and that for fixing the coated portion have any appropriate section shape such as a V-like shape or a trapezoidal shape. The depth and width of the grooves are preferably set so that the center axis of the optical fiber and that of the ferrule are on the same line.

Figure 5A:
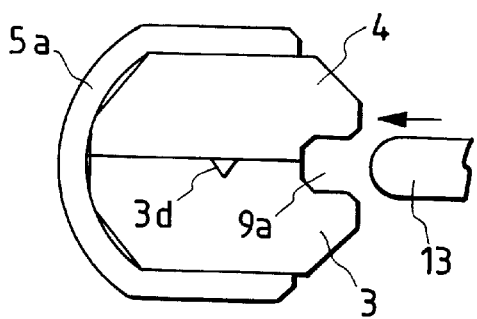
FIGS. 5A and 5B are diagrams illustrating a state in which a wedge is inserted.
Figure 5B:
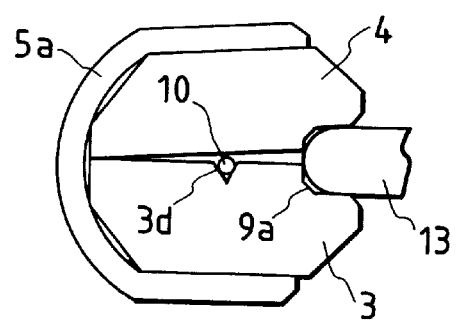

FIGS. 5A and 5B are diagrams illustrating the state in which a wedge is inserted. In the figure, the components identical with those of FIGS. 4A and 4B are designated by the same reference numerals and their description is omitted. As shown in FIG. 5A, a wedge 13 having a thickness which is greater than the height of the wedge insertion hole 9a is pressingly inserted into the wedge insertion hole 9a in the direction of the arrow. When the wedge 13 is pressingly inserted, the base member 3 and the cover member 4 are forcedly separated from each other against the resilient force of the clamp member 5a as shown in FIG. 5B, thereby enabling the optical fiber 10 to be inserted between them. After the optical fiber 10 is inserted to a predetermined position, the wedge 13 is detached. Then, the state returns to that of FIG. 5A and the optical fiber is fixed to the optical fiber positioning and fixing groove 3d by the resilient force of the clamp member 5a. A wedge is similarly inserted also into the wedge insertion hole 9b of FIG. 4B, so that the base member 3 and the cover member 4 are forcedly separated from each other, thereby facilitating the coated portion of the optical fiber 10 to be inserted between them. When the wedge is detached, the optical fiber can be fixed.

Figure 6:
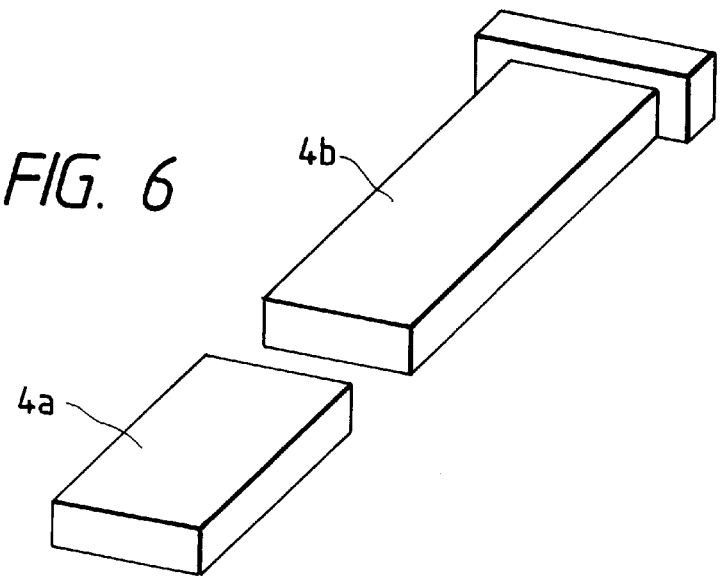
FIG. 6 shows a modification of a cover member.

FIG. 6 shows a modification of the cover member. In the modification, the pressing portion 4a which presses the portion in the optical fiber positioning and fixing groove 3d (FIG. 2), and the pressing portion 4b which presses the portion in the optical fiber positioning and fixing groove 3e (FIG. 2) are configured as separate members.

FIGS. 7 and 8 show modifications of the clamp member. In FIG. 2, the clamp member 5b is divided into two parts by the notch 5c. As shown in FIG. 7, the notch may not be formed. In FIG. 2, the clamp members 5a and 5b are configured as separate members. As shown in FIG. 8, the clamp members may be configured as a single member.

The short optical fiber 2 is projected from the rear end of the ferrule, and, under the state where the ferrule is fitted into the base member, inserted into the optical fiber positioning and fixing groove of the base member. The optical fiber may be sometimes bent at the outlet of the ferrule and the inlet of the optical fiber positioning and fixing groove. Such a case occurs when a production error causes the center axis of the ferrule to be misaligned with that of the optical fiber housed in the V-groove serving as the optical fiber positioning and fixing groove. As a method of improving static fatigue properties due to a bend applied to the short optical fiber, therefore, a coating for reinforcing the short optical fiber may be employed. The coating may be a metal coating, a carbon coating, or the like.

Preferably, a free space is formed in order to prevent an extreme bending force from being applied to the short optical fiber. FIGS. 9A to 9C are diagrams illustrating such a free space. The hatched portions of the short optical fiber 2 are fixed by the ferrule and the V-groove, respectively. The amount of deviation between the center axes of the fixed portions is called the offset amount. In the configuration wherein a space in which the portion of the short optical fiber 2 between the fixed portions takes a free path is produced, no large bending force is applied to the short optical fiber 2. For example, the length L of the free space is set to be 2 mm or longer in the case where the offset amount is 0.02 mm, or 2.5 mm or longer in the case where the offset amount is 0.03 mm. According to this configuration, even in a long-term use, it is possible to prevent a trouble from occurring in the short optical fiber 2.

The free space may be produced so as to ensure the length L of the free space by, for example, using one or both of the following methods: a method in which a space is formed in the rear end portion of the ferrule 1 as shown in FIG. 9B; and that in which the V-groove of the base member 3 and the cover member are retracted from the rear end face of the ferrule 1 as shown in FIG. 9C.

The optical connector of the embodiment is stored until it is used in the filed, under a state where, as shown in FIGS. 1A to 1C, the short optical fiber 2 incorporated in the ferrule 1 and projected from the rear end of the ferrule is pressed by the cover member 4 against the optical fiber positioning and fixing groove 3d of the base member 3.

When the optical connector is stored under a state where the optical fiber is always pressed against the optical fiber positioning and fixing groove 3d of the base member 3, there is a possibility that the portion of the optical fiber positioning and fixing groove 3d which is contacted with the optical fiber creeps to be deformed.

Figure 10A:
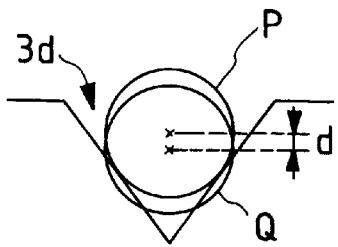
FIGS. 10A and 10B are diagrams illustrating a state where an optical fiber positioning and fixing groove is deformed.
Figure 10B:
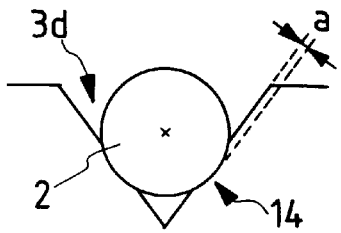

FIGS. 10A and 10B are diagrams illustrating a state where the optical fiber positioning and fixing groove is deformed. Under the state where the cover member (not shown) exerts a small pressing force so that short optical fiber is merely contacted with the optical fiber positioning and fixing groove 3d as shown in FIG. 10A, the optical fiber positioning and fixing groove 3d is not deformed at the contact portions and the short optical fiber is at the position P. When the clamp member applies a pressing force to the cover member, the pressing force is concentrated to the contact portions of the side walls of the optical fiber positioning and fixing groove 3d with which the short optical fiber is contacted. With the passage of time, a creep phenomenon occurs to depressingly deform the side walls. When the deformation advances, the position of the optical fiber is lowered. As the deformation amount becomes larger, the contact area between the short optical fiber and the optical fiber positioning and fixing groove 3d is increased. Therefore, the pressing force per unit area is reduced and the advance rate of the deformation is lowered. It is assumed that, in the case where deformed portions 14 are formed in the side walls by the short optical fiber 2 as shown in FIG. 10B, the short optical fiber is lowered to the position Q of FIG. 10A when the deformation amount is α. The center position of the short optical fiber is lowered by a distance d from the position in the case where the side walls are not deformed.

When the optical connector in which such deformation is produced is attached to the front end of the optical fiber as described with reference to FIGS. 3A, 3B and 4A, 4B, the short optical fiber is deviated from the optical fiber which is to be attached to the optical connector, by the distance d which has been described with reference to FIG. 10A, because the optical fiber positioning and fixing groove in the portion where the optical fiber is to be attached is not deformed, resulting in the increased coupling loss. Embodiments which can cope with such deformation of the optical fiber positioning and fixing groove will be described.

Figure 11:
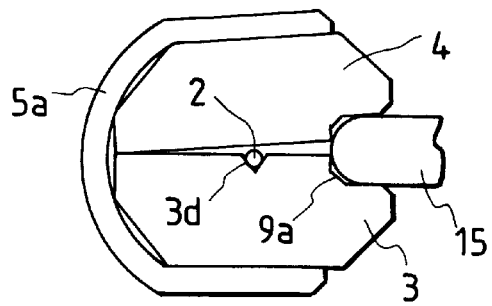
FIG. 11 is a diagram illustrating a second embodiment of the optical connector of the invention.

FIG. 11 illustrates a second embodiment of the optical connector of the invention and is a section view taken along the line D—D of FIG. 1C. The stop ring 6 and the plug frame 7 are not shown in the figure. In the figure, the components identical with those of FIGS. 5A and 5B are designated by the same reference numerals and their description is omitted. The reference numeral 15 designates a dummy member. In the embodiment, the dummy member 15 is inserted into the wedge insertion hole 9a. A dummy member may be inserted also into the wedge insertion hole 9b. The dummy member 15 is used for, during a period when the optical connector is stored, separating the base member 3 and the cover member 4 from each other in order that the pressing force of the cover member 4 is not applied to the short optical fiber or, even when a pressing force is applied, the pressing force is made lessened so that no substantially pressing force is exerted on the short optical fiber. Under the state where the optical connector is stored, the use of the dummy member 15 prevents the optical fiber positioning and fixing groove from being subjected to a pressing force which may deform the groove. When the optical connector is attached to an optical fiber, therefore, the positional deviation between the short optical fiber and the optical fiber is prevented from occurring.

The optical connector is attached to the optical fiber in the following manner. In the case where the dummy member 15 having a size similar to that of the wedge described with reference to FIGS. 5A and 5B, the optical fiber is inserted into the optical connector, and the dummy member 15 is then detached from the optical connector, whereby the optical connector can be connected to the optical fiber. In the case where the dummy member 15 having a size at which, when the dummy member 15 is attached to the optical connector, a gap sufficient for inserting the optical fiber is not formed is used, the dummy member 15 is detached from the optical connector when the connector is to be attached to the optical fiber. Thereafter, the optical connector is attached to the optical fiber by using the wedge described with reference to FIGS. 5A and 5B.

Figure 12:
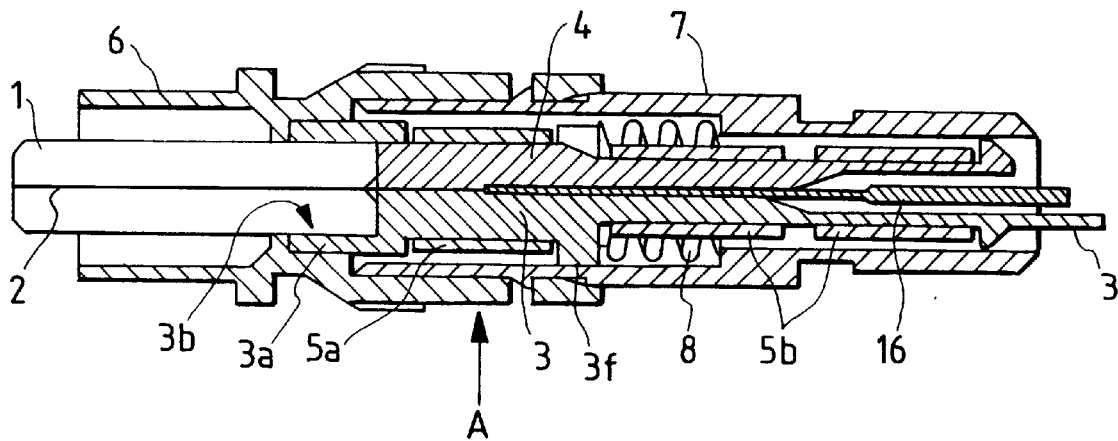
FIG. 12 is a diagram illustrating a third embodiment of the optical connector of the invention.

FIG. 12 illustrates a third embodiment of the optical connector of the invention and is a section view similar to FIG. 1C. In the figure, the components identical with those of FIGS. 1A to 1C are designated by the same reference numerals and their description is omitted. The reference numeral 16 designates a cylindrical member. In the embodiment, the cylindrical member 16 serving as a cylindrical dummy member is inserted into the optical fiber positioning and fixing groove at the rear end of the short optical fiber 2. Preferably, the cylindrical member 16 has a hardness and an outer diameter which are substantially equal to those of the short optical fiber. In the case where the short optical fiber is a silica optical fiber, it is preferable to use a silica optical fiber as the cylindrical member 16. The cylindrical member 16 is attached to the optical connector during the work of assembling the connector.

When the optical connector is to be connected to the optical fiber, a wedge is inserted as described with reference to FIGS. 5A and 5B so as to forcedly separate the base member 3 and the cover member 4 from each other, the cylindrical member 16 is detached from the connector, the optical fiber to be connected is inserted, and the wedge is then detached from the connector. As a result of the attachment of the cylindrical member 16, under the state where the optical connector is stored, a creep phenomenon occurs both in the portion of the optical fiber positioning and fixing groove in which the short optical fiber 2 is positioned, and that of the optical fiber positioning and fixing groove in which the cylindrical member 16 is positioned, in the same conditions. Therefore, no positional deviation is produced between the optical fiber to be connected, and the short optical fiber.

Figure 13A:
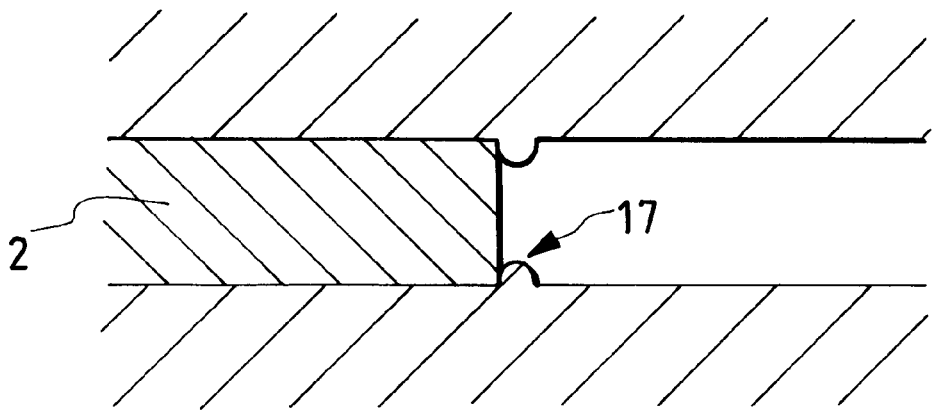
FIGS. 13A and 13B are diagrams illustrating a state where the optical fiber positioning and fixing groove is deformed.
Figure 13B:
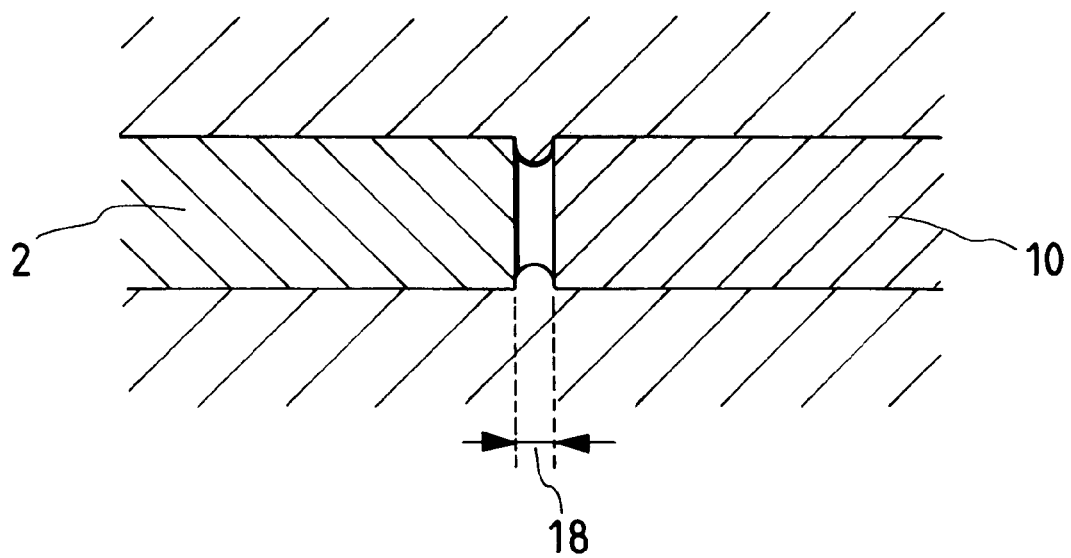

The deformation of the optical fiber positioning and fixing groove which has been described with reference to FIGS. 10A and 10B is problematic also in a deformation state in the vicinity of the rear end portion of the short optical fiber. FIGS. 13A and 13B are section views of the optical fiber positioning and fixing groove and taken in a plane which passes the center axis of the short optical fiber and which is parallel with the upper face of the base member, FIGS. 13A shows a state where the optical fiber has not yet been connected, and FIG. 13B shows a state where the optical fiber to be connected is positioned. In the figures, 2 designates a short optical fiber, and 10 designates an optical fiber. When the short optical fiber 2 is pressed against the optical fiber positioning and fixing groove and a creep phenomenon occurs, the portion of the optical fiber positioning and fixing groove with which the short optical fiber 2 is contacted is deformed and the position of fixing the short optical fiber is lowered as described with reference to FIGS. 10A and 10B. In the rear end portion of the short optical fiber 2, at the same time when the side walls are depressed, a part of the material constituting the side walls is moved and a bulge portion 17 is formed in the rear of the short optical fiber 2.

When the optical fiber 10 is positioned in the optical fiber positioning and fixing groove in which the bulge portion is formed, the bulge portion 17 obstructs the positioning, so that a gap 18 is formed between the short optical fiber 2 and the optical fiber 10 as shown in FIG. 13B, thereby increasing the coupling loss.

Figure 14A:
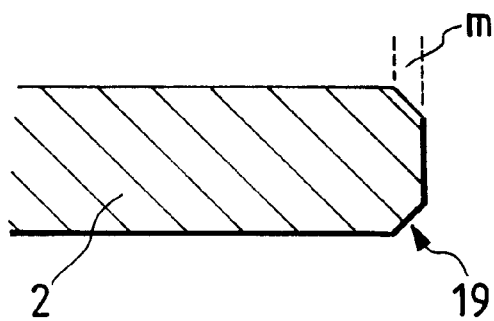
FIGS. 14A, 14B and 14C are diagrams illustrating a fourth embodiment of the optical connector of the invention.
Figure 14C:
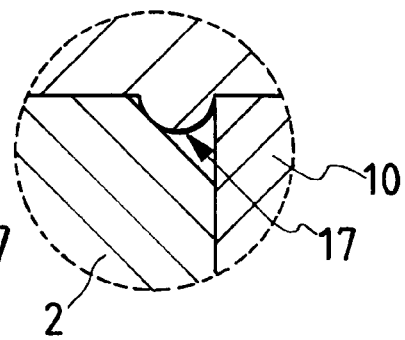
Figure 14B:
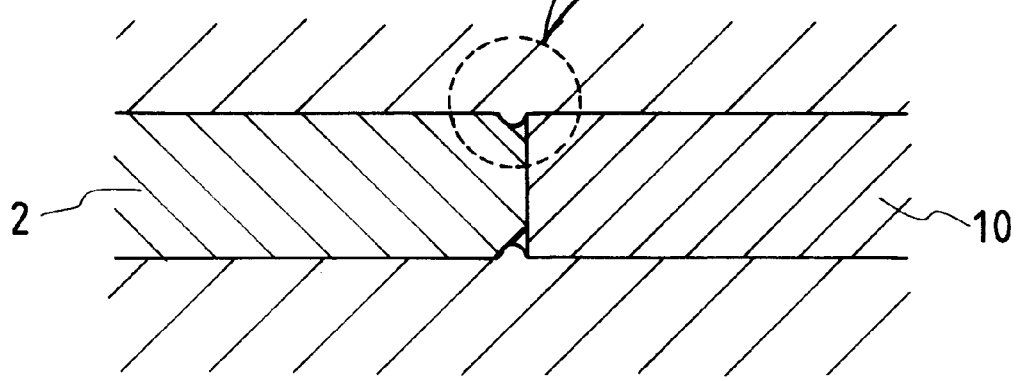

FIGS. 14A to 14C illustrate a fourth embodiment of the optical connector of the invention. FIG. 14A is a section view of a part of a short optical fiber, FIG. 14B is a diagram illustrating a state where optical fibers are connected together, and FIG. 14C is an enlarged view of a part of FIG. 14b. In the figures, the components identical with those of FIGS. 13A and 13B are designated by the same reference numerals and their description is omitted. The reference numeral 19 designates a chamfered portion. In the embodiment, the chamfered portion 19 is formed in the outer periphery of the rear end face of the short optical fiber 2 as shown in FIG. 14A. The chamfered portion 19 may be formed by a method such as that in which a grinding work using a grindstone is conducted, or that in which the surface is slightly fused by an electric discharge.

Since the chamfered portion 19 is formed on the short optical fiber 2, the formation of the bulge portion 17 is reduced in degree, and the formed bulge portion 17 can be accommodated in the periphery of the chamfered portion 19. Therefore, the optical fiber 10 can abut against the short optical fiber 2 as shown in FIGS. 14B and 14C. The formation of the chamfered portion 19 prevents the cover member and the base member from being damaged. When the size m of the chamfered portion 19 is set not to be smaller than 10 μm, the connector can be prevented from being adversely affected by the bulge portion 17.

Even though the short optical fiber 2 and the optical fiber 10 are butted against each other while avoiding an adverse effect due to the bulge portion 17, the axial misalignment due to the lowered distance d which has been described with reference to FIG. 10A cannot be canceled. However, the optical fiber 10 is pressed by the cover member to be lowered while deforming the optical fiber positioning and fixing groove. Therefore, also the axial misalignment can be canceled. In the case where aluminum or plastics is used as the material of the base member, particularly, the deformation rapidly advances. When the optical connector is attached to the optical fiber, therefore, the axial misalignment can be canceled in a short time. Consequently, the embodiment is particularly effective in the case where the optical fiber positioning and fixing groove is formed in such a material which is easily plastically deformed.

As apparent from the description above, the optical connector of the invention comprises: a ferrule which incorporates a short optical fiber in a small bore which is formed along a center axis, the short optical fiber being projected from a rear end of the ferrule, the ferrule having a polished front end face; a base member having a holding portion which holds the rear end of the ferrule, and an optical fiber positioning and fixing groove which is formed in an upper face to be continuous with the small bore; a cover member which presses an optical fiber against the optical fiber positioning and fixing groove; and a clamp member which presses the cover member toward the base member, the connector further comprising a wedge insertion portion into which a wedge for pressingly separating the cover member and the base member from each other can be inserted. Consequently, the optical fiber can be inserted only by inserting the wedge into the optical connector, and the optical connector can be attached to the front end of the optical fiber by detaching the wedge. During a work of attaching the optical connector, therefore, it is not required to conduct works of grinding, fusion, adhesion, and the like, and the work of attaching the optical connector can be completed in a short time.

According to the invention, the cover member presses an optical fiber to be attached to the optical connector, toward the base member and against the optical fiber positioning and fixing groove at two portions, i.e., a portion where the short optical fiber is connected with the optical fiber to be attached, and a coated portion of the optical fiber to be attached. Therefore, the portion where the short optical fiber is connected with the optical fiber to be connected can be fixed, and hence a stable connection state can be maintained. Furthermore, the attachment of the coated portion can be firmly done.

According to the invention, the wedge insertion portion is disposed so as to pressingly separate the cover member and the base member from each other at the two portions, i.e., the portion where the short optical fiber is connected with the optical fiber to be attached, and the coated portion of the optical fiber to be attached. After the connection of the optical fibers is ensured, therefore, the coated portion can be fixed.

According to the invention, the optical fiber positioning and fixing groove formed in the base member has a V-like section shape or a trapezoidal section shape. Therefore, it is possible to suppress the connection loss due to the axial misalignment.

According to the invention, the short optical fiber has a mirror-finished rear end. Therefore, it is possible to suppress the connection loss and reflection return light at the point where the short optical fiber is connected with the optical fiber.

According to the invention, the front end face of the ferrule is polished into a spherical shape, obliquely mirror-polished, or mirror-polished in a direction perpendicular to an optical fiber axis. Therefore, it is not required to polish the front end of the ferrule in the field.

According to the invention, the base member is made of a substance having a coefficient of linear expansion which is substantially equal to a coefficient of linear expansion of the optical fiber. Therefore, it is possible to suppress the loss variation due to a temperature change.

According to the invention, an outer periphery of the short optical fiber is coated by a metal or carbon. Therefore, it is possible to realize reinforcement to a bend between the ferrule and the optical fiber positioning and fixing groove.

According to the invention, a space in which the optical fiber is free is formed between a rear end of the small bore of the ferrule and a front end of a fiber presser which presses the short optical fiber and which is disposed on the base member. Therefore, it is possible to suppress an effect due to the axial misalignment between the ferrule and the optical fiber positioning and fixing groove.

According to the invention, a housing which can be fitted with an SC type optical connector is attached to the optical connector. Therefore, it is possible to provide an SC type connector which can be rapidly assembled.

According to the invention, the wedge can be inserted or detached under a state where a housing is assembled. Therefore, it is possible to attach the optical connector to the optical fiber in a short time.

According to the invention, the chamfer formed on the outer periphery of the rear end face of the short optical fiber can suppress the formation of a bulge portion which may be produced in the groove in which the short optical fiber is to be positioned, and allow the produced bulge portion to be accommodated in the periphery of the chamfered portion. Furthermore, the portion with which the rear end portion of the short optical fiber is contacted can be made hardly damaged.

According to the invention, in the optical fiber positioning and fixing groove under the state where the optical connector is stored, the portion to which the short optical fiber is fixed and that to which the optical fiber to be connected are similarly deformed, Therefore, it is possible to eliminate the axial misalignment between the optical fiber to be connected and the short optical fiber.

According to the invention, the cover member and the base member are prevented by the dummy member from substantially exerting a pressing force on the short optical fiber. Therefore, the optical fiber positioning and fixing groove is not deformed by the short optical fiber.

According to the invention, a work of attaching the optical connector to a terminal of an optical fiber can be simplified and completed in a short time.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical connector comprising:
   a ferrule which incorporates a short optical fiber in a small bore which is formed along a center axis, said short optical fiber being projected from a rear end of said ferrule, said ferrule having a polished front end face;
   a base member having a holding portion which holds said rear end of said ferrule, and an optical fiber positioning and fixing groove which is formed in an upper face to be continuous with said small bore;
   a cover member which presses an optical fiber against said optical fiber positioning and fixing groove;
   a clamp member which presses said cover member toward said base member; and
   a wedge insertion portion into which a wedge for pressingly separating said cover member and said base member from each other can be inserted.

2. An optical connector according to claim 1, wherein said cover member presses an optical fiber to be attached to said optical connector, toward said base member and against said optical fiber positioning and fixing groove at two portions where said short optical fiber is connected with the optical fiber to be attached, and where a coated portion of the optical fiber to be attached.

3. An optical connector according to claim 2, wherein said wedge insertion portion is disposed so as to pressingly separate said cover member and said base member from each other at the two portions, where said short optical fiber is connected with the optical fiber to be attached, and where the coated portion of the optical fiber to be attached.

4. An optical connector according to claim 1, wherein said optical fiber positioning and fixing groove formed in said base member has a V-like section shape.

5. An optical connector according to claim 1, wherein said optical fiber positioning and fixing groove formed in said base member has a trapezoidal section shape.

6. An optical connector according to claim 1, wherein said short optical fiber has a mirror-finished rear end.

7. An optical connector according to claim 1, wherein said front end face of said ferrule is polished into a spherical shape.

8. An optical connector according to claim 1, wherein said front end face of said ferrule is obliquely mirror-polished.

9. An optical connector according to claim 1, wherein said front end face of said ferrule is mirror-polished in a direction perpendicular to an optical fiber axis.

10. An optical connector according to claim 1, wherein said base member is made of a substance having a coefficient of linear expansion which is substantially equal to a coefficient of linear expansion of the optical fiber.

11. An optical connector according to claim 1, wherein an outer periphery of said short optical fiber is coated by a metal or carbon.

12. An optical connector according to claim 1, wherein a space in which the optical fiber is free is formed between a rear end of said small bore of said ferrule and a front end of a fiber presser which presses said short optical fiber and which is disposed on said base member.

13. An optical connector according to claim 1, wherein a housing which can be fitted with an SC type optical connector is attached to said optical connector.

14. An optical connector according to claim 1, wherein said wedge can be inserted or detached under a state where a housing is assembled.

15. A method of attaching an optical connector comprising a ferrule which incorporates a short optical fiber in a small bore which is formed along a center axis, said short optical fiber being projected from a rear end of said ferrule, said ferrule having a polished front end face; a basemember having a holding portion which holds said rear end of said ferrule, and an optical fiber positioning and fixing groove which is formed in an upper face to be continuous with said small bore; a cover member which presses an optical fiber against said optical fiber positioning and fixing groove; a clamp member which presses said cover member toward said base member; and a wedge insertion portion into which a wedge for pressingly separating said cover member and said base member from each other can be inserted, said method comprising the steps of:
   inserting said wedge into said wedge insertion portion to form a space into which the optical fiber can be inserted, between said base member and said cover member;
   inserting the optical fiber from a rear side of said optical connector until the optical fiber abuts against said short optical fiber; and
   detaching said wedge to attach said optical connector to a terminal of the optical fiber.

* * * * *